US006626272B2

(12) United States Patent
Frouin

(10) Patent No.: US 6,626,272 B2
(45) Date of Patent: Sep. 30, 2003

(54) PROTECTIVE SCREEN FOR BRAKE DISC AND ASSEMBLY FOR THE ROTARY CONNECTION OF A WHEEL TO A ROAD VEHICLE, INCLUDING SUCH A SCREEN

(75) Inventor: Thierry Frouin, Draveil (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/982,332

(22) Filed: Oct. 18, 2001

(65) Prior Publication Data
US 2002/0046910 A1 Apr. 25, 2002

(30) Foreign Application Priority Data
Oct. 25, 2000 (FR) ...................................... BFF 00/0238

(51) Int. Cl.[7] .............................................. F16D 65/12
(52) U.S. Cl. .................................. 188/218 A; 188/18 A
(58) Field of Search ...................... 188/218 A, 18 A, 188/18 R, 17, 264 W; 301/6.3, 37.101; 280/159, 160

(56) References Cited

U.S. PATENT DOCUMENTS 4,253,552 A * 3/1981 Shibatani et al. ....... 188/218 A
4,295,549 A * 10/1981 Shibatani et al. ....... 188/218 A

FOREIGN PATENT DOCUMENTS

| EP | 0 783 606 A2 | 1/1997 |
| FR | 2 782 359 | 8/1998 |
| JP | 58193943 | 11/1983 |
| JP | 58-193943 A | * 11/1983 |
| JP | 01192225 | 7/1989 |

* cited by examiner

Primary Examiner—Jack Lavinder
Assistant Examiner—Thomas J. Williams
(74) Attorney, Agent, or Firm—Scott A. McBain

(57) ABSTRACT

A protective screen for a road vehicle brake disc includes at least one elastic holding organ (27; 30) intended to be compressed in an axial gap between a pivot support (11) and a bearing module (13), present after direct clamping of the bearing module (13) onto the pivot support (11).

An assembly for the rotary connection of a wheel to a road vehicle includes a pivot support (11) and a bearing module clamped directly to each other, and such a protective screen (12) held in position due to the compression of the elastic organ (27; 30).

20 Claims, 5 Drawing Sheets

PROTECTIVE SCREEN FOR BRAKE DISC AND ASSEMBLY FOR THE ROTARY CONNECTION OF A WHEEL TO A ROAD VEHICLE, INCLUDING SUCH A SCREEN

The invention relates to a protective screen for a brake disc.

The invention also relates to an assembly for the rotary connection of a wheel to a road vehicle, including such a screen.

Such an assembly includes a pivot support, intended to be mounted on the vehicle, a bearing module and, arranged between them, a protective screen also called a mud screen. The bearing module is intended to receive a wheel and, interposed between it and this bearing module, a brake disc which the protective screen has the function of protecting.

A first solution for the assembly of these elements consists of clamping together the pivot support, the protective screen and the bearing module by means of axial screws. As, in this arrangement, the pivot support and the bearing module do not bear directly one against the other, the protective screen being interposed between them, the precision with which the respective axes of the pivot support and the bearing module are aligned with each other is reduced. Now, where the bearing module is intended to receive a wheel supporting a road vehicle, this precision has particular importance. Also, certain motor vehicle manufacturers reject this first solution.

A second solution consists of clamping the pivot support and the bearing module directly against each other, the protective screen being mounted separately on the pivot support, either by means of additional screws, or by being force fitted on a surface machined on one of these pieces.

Compared with the first solution, this second solution requires additional operations, namely in one case the drilling of the holes intended to receive the screws for fixing the protective screen and the screwing or bolting of these, or, in the other case, the machining of a surface and the force fitting of the protective screen. Such operations consume time and use machines. Consequently, they have a cost, as do the additional screws used in one of these two cases to fix the protective screen.

The invention therefore has the aim of reducing the number of operations and/or the number of components necessary to mount a protective screen on an assembly in which a bearing module and a pivot support are assembled by direct clamping one against the other.

To this end, the invention has as its object a protective screen for a brake disc of a road vehicle, comprising an annular plate intended to be associated with a pivot support and a bearing module for mounting a wheel of the vehicle, characterised by the fact that it includes at least one elastic organ for holding by compression in an axial gap between the pivot support and the bearing module, present after clamping of the bearing module on the pivot support.

In accordance with other characteristics:
the central part of the screen is flat with the exception of the elastic organ which moves progressively away from the plane of this central part;
the elastic organ is formed of a flexible strip defined by the edge of a central opening in the protective screen and by two slots opening into the said central opening;
the elastic organ is formed by a projection of the material of the screen;
it includes two radial pressure tongues associated with the elastic organ and each arranged on one side of this elastic organ;
it includes a plurality of elastic organs distributed around the central opening in the plate;
it is formed by pressing a thin metal sheet.

The invention also has as its object an assembly for the rotary connection of a wheel to a road vehicle, including a pivot support intended to be mounted on the vehicle and a bearing module intended to receive a brake disc and the wheel, the pivot support and the bearing module being assembled by direct clamping of the one to the other, characterised by the fact that it includes a protective screen of the type defined above, at least two surfaces, each forming a jaw, situated on the pivot support and on the bearing module respectively defining together, after direct clamping of the bearing module onto the pivot support, a clamp for clamping and holding the elastic organ of the protective screen.

In accordance with other characteristics:
the said jaws bear one on the flat central part and the other on the elastic organ of the said screen;
the bearing module has an axial centring block housed in an axial bore of complementary form, formed in the pivot support and the assembly includes a plurality of clamps each clamping a corresponding elastic organ of the said protective screen;
the end surfaces of the said radial pressure tongues, each forming a centring organ, are applied to the peripheral surface of the centring block in various locations distributed around this;
the jaws of the said at least one clamp are situated the one in the plane of clamping by direct contact of the pivot support and of the bearing module and the other offset relative to this clamping plane;
the central opening includes notches for the passage of bosses, which are either formed on the pivot support and clamped directly onto the bearing module, or formed on the bearing module and clamped directly onto the pivot support.

The invention will be better understood on reading the following description, given solely by way of example and made with reference to the attached drawings, in which.

Figure 1:
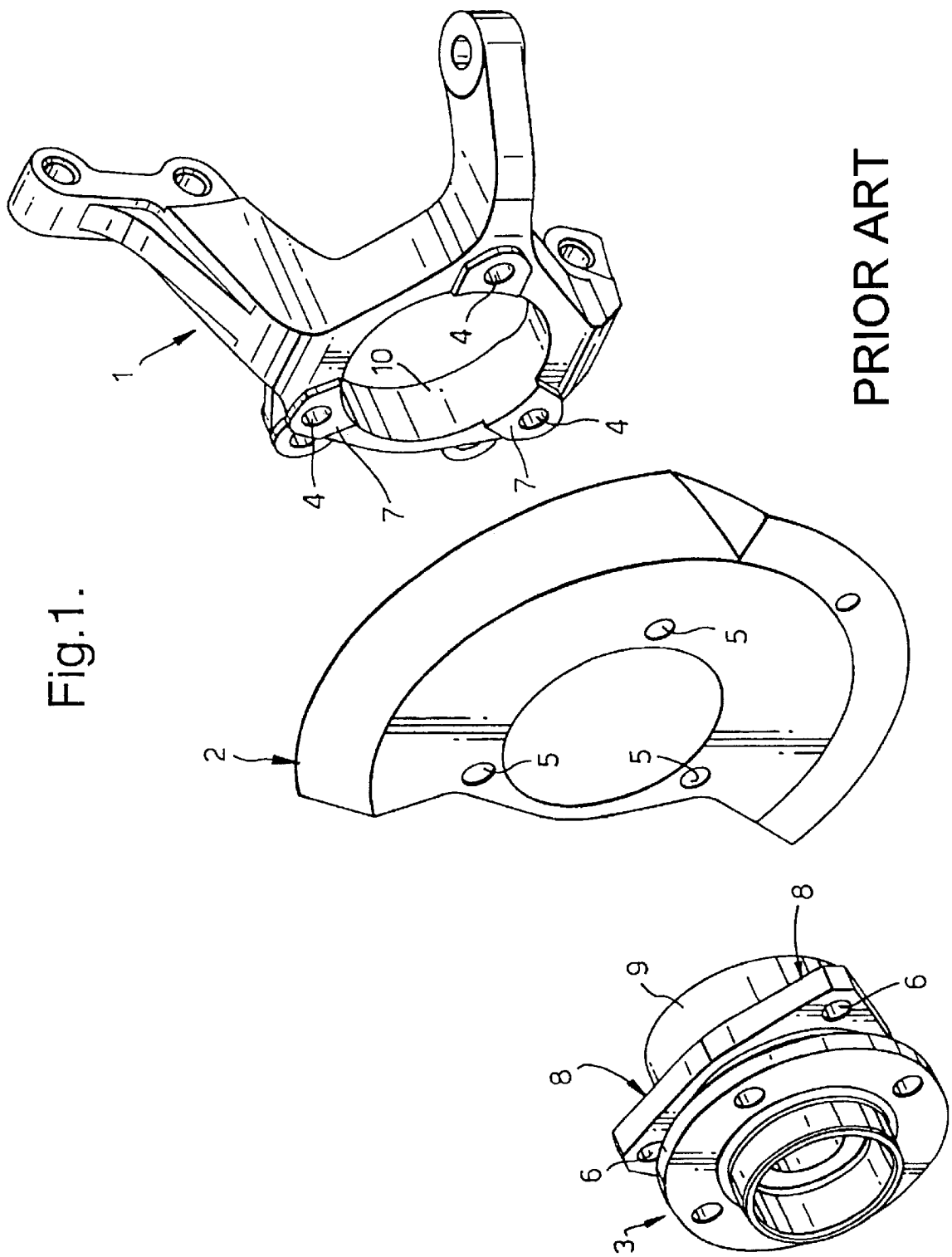
FIG. 1 is an exploded view of an assembly of the prior art, intended for rotary connection of a wheel to a motor vehicle.

In FIG. 1, in an exploded view, is shown an assembly of the prior art, intended for the pivoting connection of a wheel to a road vehicle. This assembly consists of a pivot support 1, a protective screen 2 or mud shield and a bearing module 3, which are each drilled with three holes, marked, on the pivot support 1, the protective screen 2 and the bearing module 3 with the reference numbers 4, 5 and 6 respectively, for the passage of three screws (not shown) keeping this assembly assembled by clamping.

In this arrangement, the protective screen 2 is clamped between clamping surfaces 7 and 8, situated on the pivot support 1 and the bearing module 3 respectively, which surfaces, due to this, do not bear directly against each other. This is detrimental to alignment, which is required to be as precise as possible of the respective axes of the pivot support 1 and the bearing module 3, despite the presence, on the bearing module 3, of a centring block 9 which is housed in a bore 10 of complementary form, formed in the pivot support 1.

FIGS. 2 to 5 show an assembly in accordance with the invention, for the rotary connection of a wheel to a road vehicle, intended to overcome the respective disadvantages of the known devices. It includes three elements, namely a pivot support 11, a protective screen 12 and a bearing module 13 intended to be assembled by means of four screws 14A.

Figure 2:
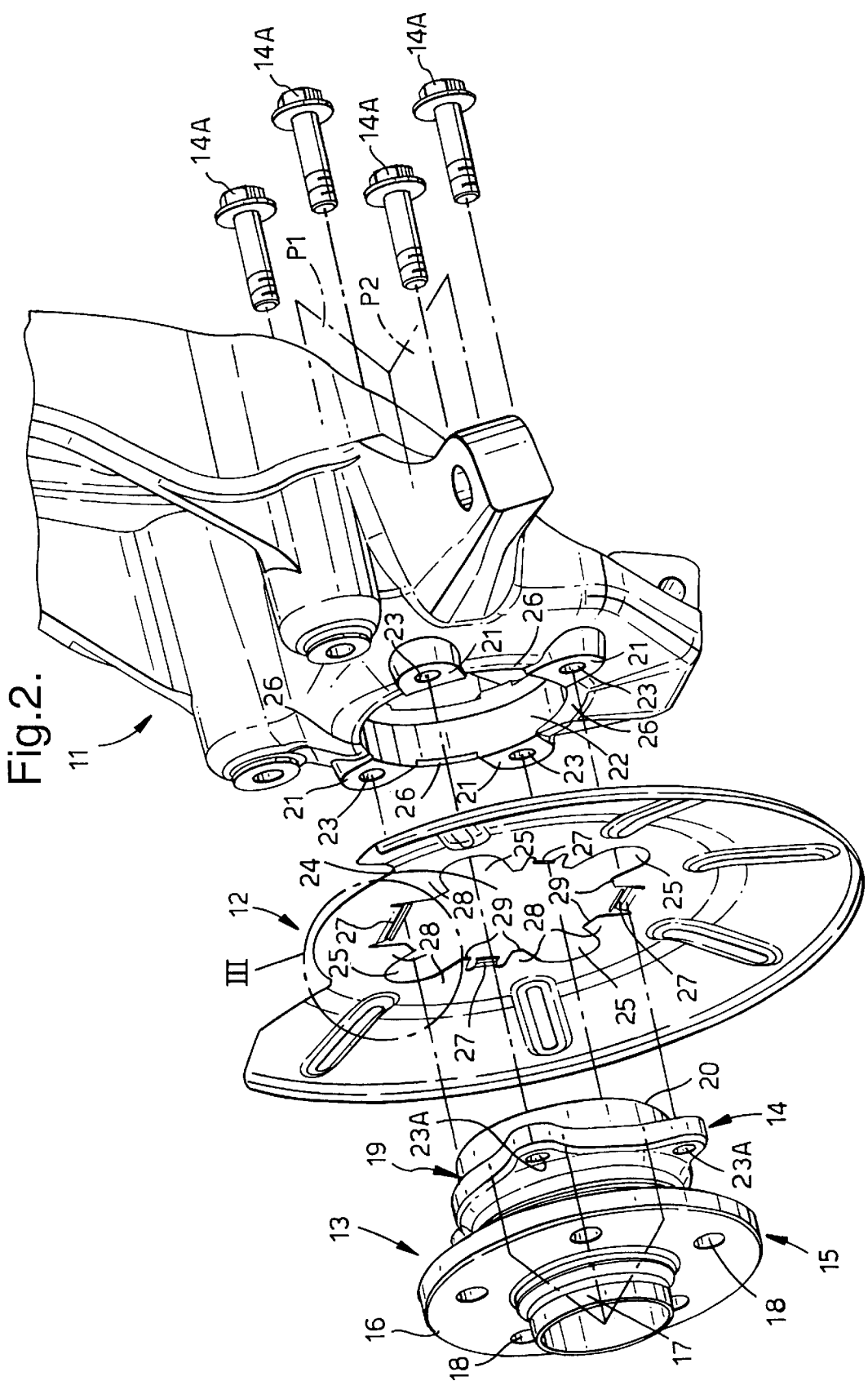
FIG. 2 is an exploded view of an assembly in accordance with the invention, for the rotary connection of a wheel to a road vehicle.

The pivot support 11, only the lower part of which has been shown in FIG. 2 for clarity, is intended to be mounted on a vehicle. The bearing module 13 includes a fixed element 14 intended to be rigidly assembled with the pivot support 11 and a turning element 15, formed of a co-axial disc 16 and hub 17, and able to receive a brake disc and a wheel (both not shown), fixing holes 18 being provided in the disc 16 to fix these. The protective screen 12, formed in one piece by pressing a thin metal sheet, has the function of protecting the brake disc mounted between the wheel and the bearing module 13 from any type of projection.

Figure 4:
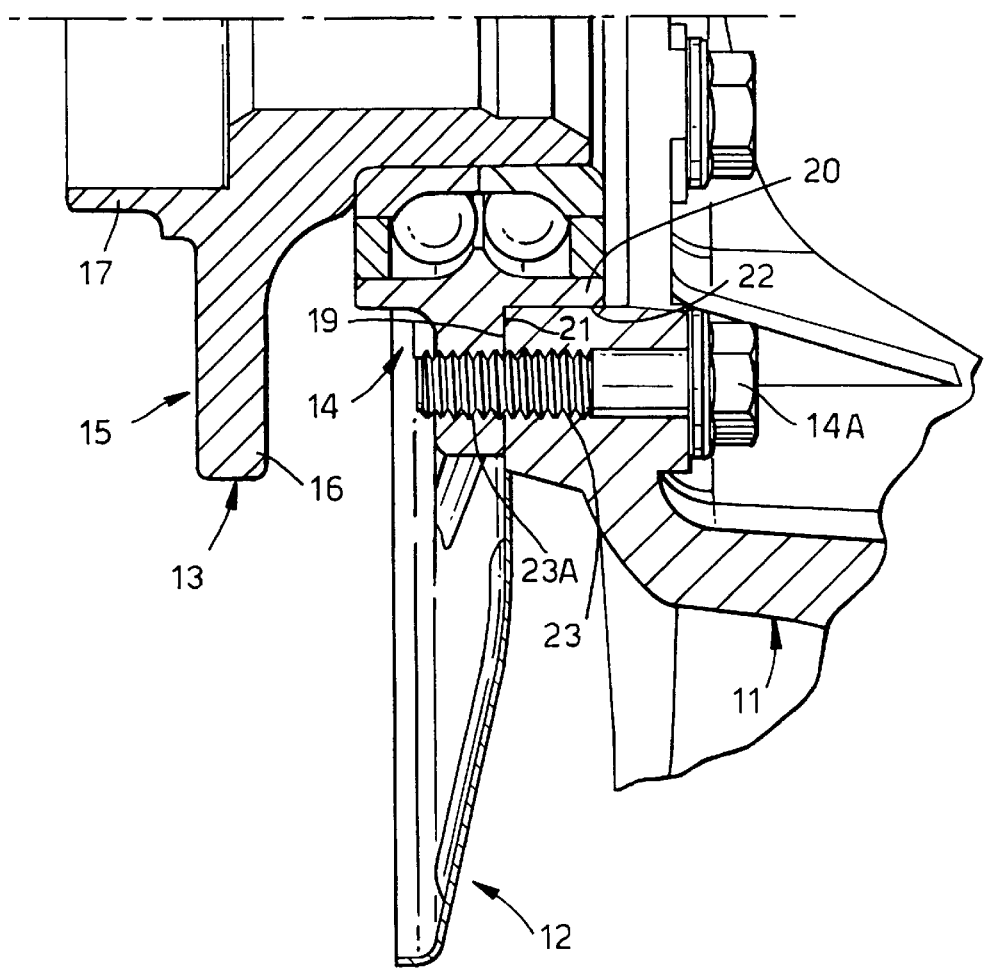
FIG. 4 is a half-view in section through the half plane P1 of FIG. 2, the assembly being assembled.

On the fixed element 14 of the bearing module 13, a flat radial surface 19, turned towards the pivot support 11, extends from an axial centring block 20 of cylindrical form, and thus forms a shoulder. Four clamping surfaces 21 carried respectively by four bosses on the pivot support 11 and regularly distributed all around an axial bore 22 receiving the centring block 20, are directly clamped against the radial surface 19 by means of screws 14A, as can be seen in FIG. 4. For this purpose, each of these clamping surfaces 21 is provided at its centre with a hole 23 receiving the shaft of a screw 14A the threaded end of which is screwed into a tapped hole 23A, itself drilled in the fixed element 14 of the bearing module 13. The clamping of the clamping surfaces 21 directly against the radial surface 19, and the close co-operation of the centring block 20 and the axial bore 22 together produce a quality alignment of the respective axes of the bearing module 13 and the pivot support 11.

The protective screen 12, arranged between the bearing module 13 and the pivot support 11, has through it a central opening 24 surrounding the centring block 20, the outline of this opening 24 also defining four notches 25 permitting the passage of the bosses carrying the clamping surfaces 21.

At the periphery of the axial bore 22, the pivot support 11 has surfaces 26 forming jaws, which are separated from each other by the clamping surfaces 21 and are set back relative to these so as to form with the radial surface 19 pairs of jaws which extend facing and spaced apart from each other and form clamps, when this pivot support 11 and the bearing module 13 are assembled by clamping one against the other.

Figure 3:
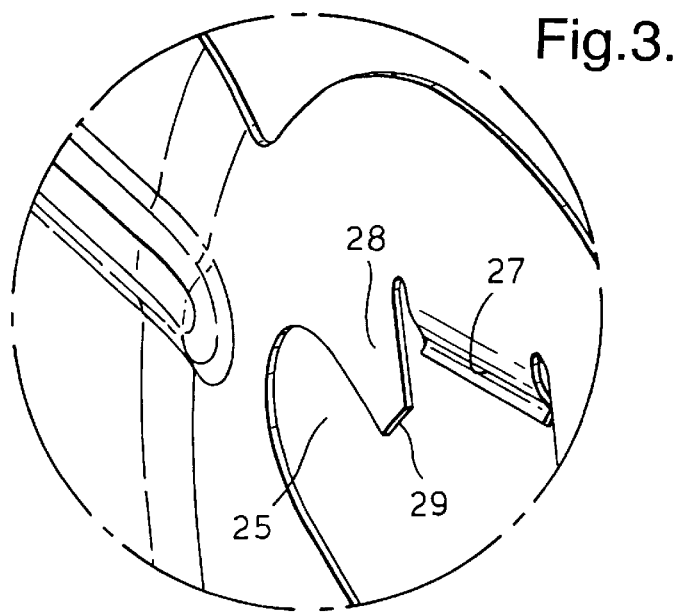
FIG. 3 is an inset showing a detail of the protective screen, defined by the circle III of FIG. 2 and enlarged.

The central part of the protective screen 12, comprising the opening 24, is flat, with the exception of four flexible strips 27 forming elastic organs, arranged between two consecutive notches 25. The flexible strips 27, particularly visible in FIG. 3, are defined by the edge of the central opening 24 and by two slots opening into this, and move progressively away from this central flat portion. On each side of each of the flexible strips 27 extends a radial tongue 28.

Figure 5A:
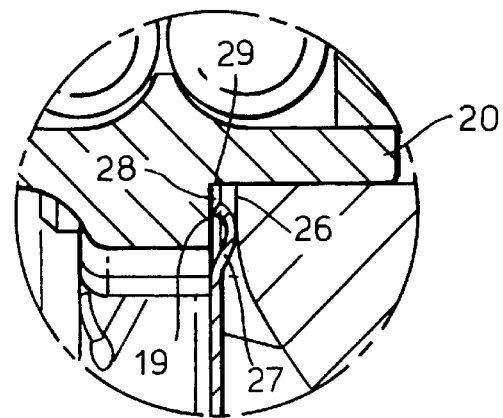
FIGS. 5 and 5A are respectively a half view in section through the half plane P2 of FIG. 2, the assembly being assembled and an enlargement of a detail.
Figure 5:
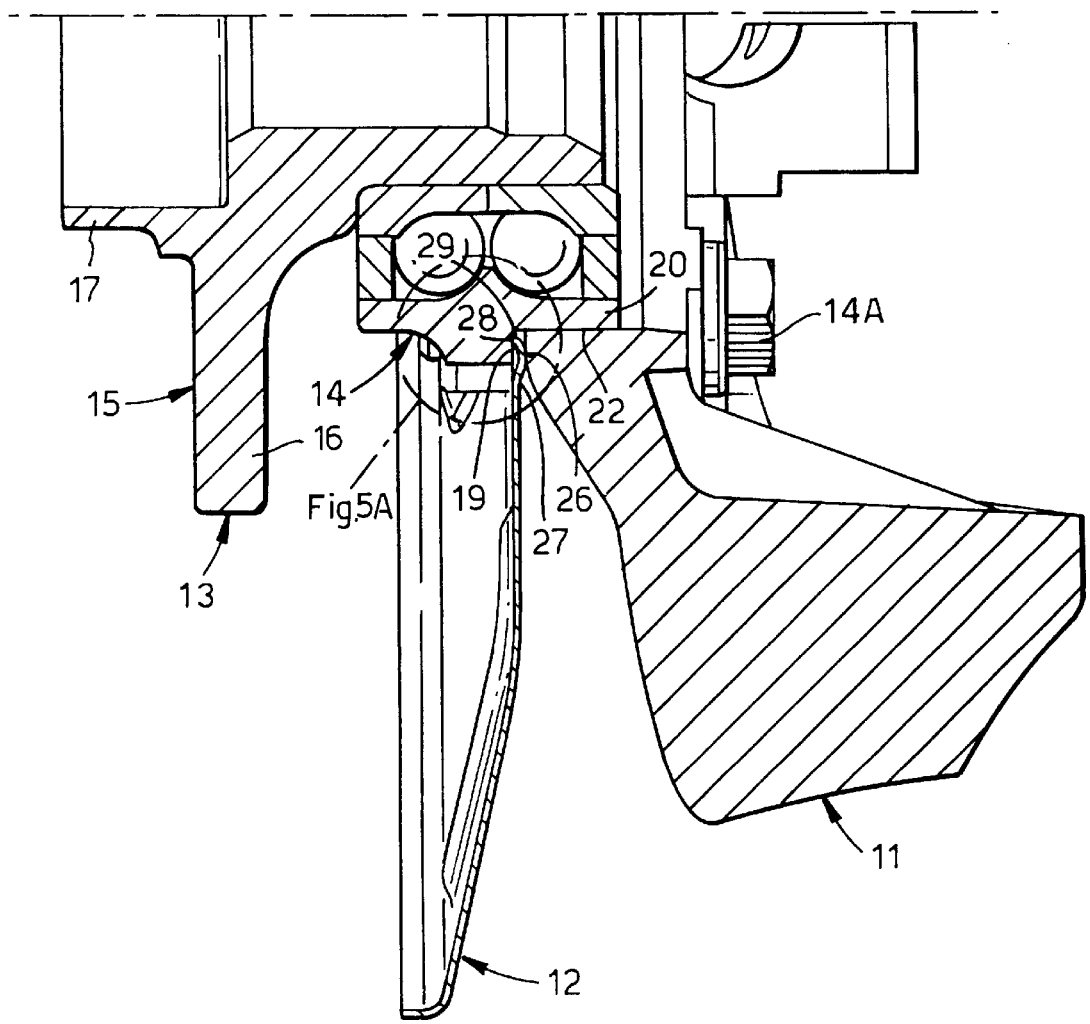

As can be seen if FIGS. 5 and 5A, the tongues 28 define pressure surfaces which are pressed onto the radial surface 19 of the bearing module 13 by means of the flexible strip 27 biased in flexion by the surface 26, forming a jaw, of the pivot support, which holds the protective screen 12 in position.

The end surfaces 29 of these tongues 28 are applied to the centring block 20, in various locations distributed all around the latter, so as to centre the position of the protective screen 12.

Figure 6:
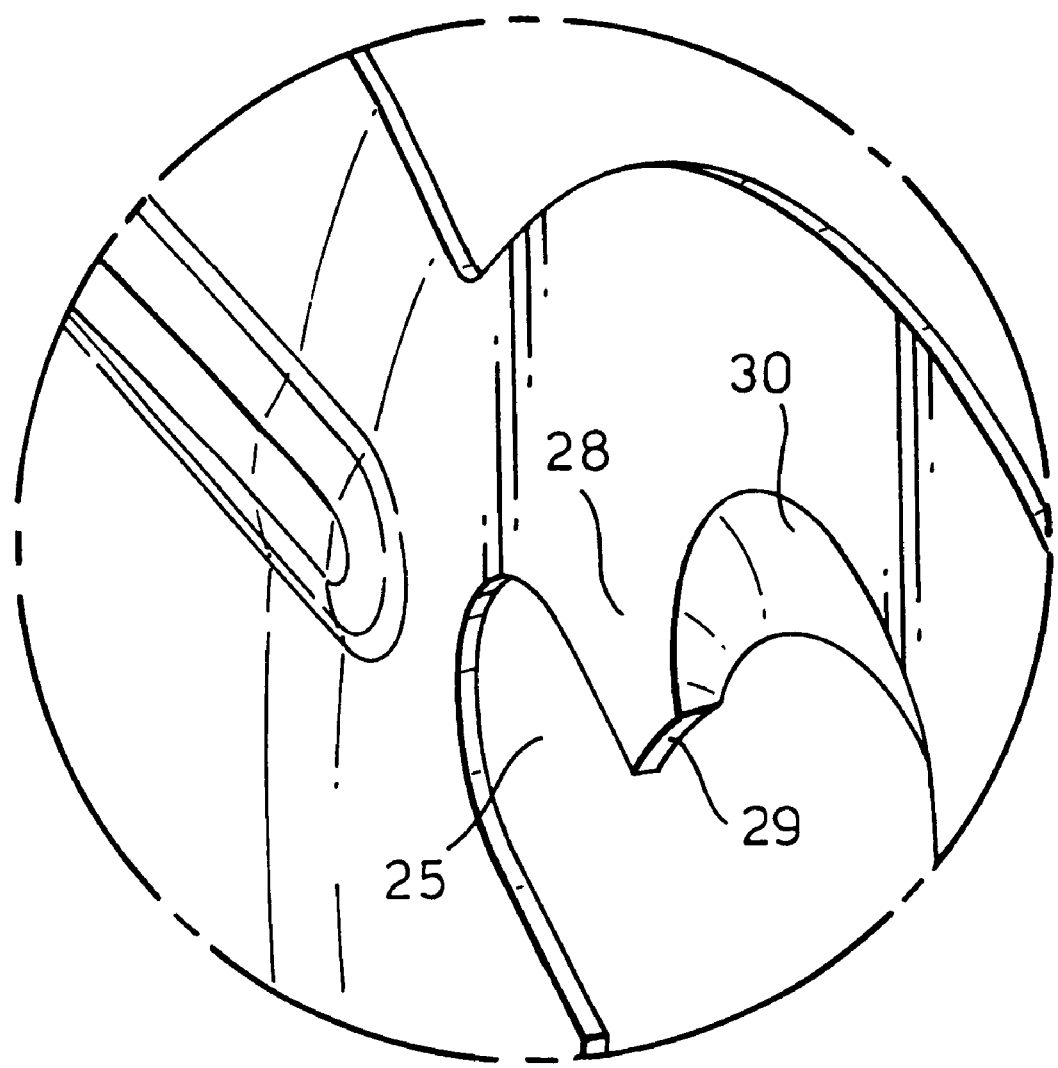
FIG. 6 is an inset similar to that of FIG. 3 showing a modified embodiment of the invention.

FIG. 6 shows a modified embodiment of the invention, in which the flexible strips 27, each forming an elastic organ, are replaced by projections 30 formed on pressing of the protective screen 12 and situated on the edge of the central opening 24.

The invention is not limited to the embodiments described above. In particular, the number, arrangement and form may be varied, in particular of the clamping surfaces 21, the surfaces 26 forming jaws, the flexible strips 27, the tongues 28, the notches 25 and the screws 14A, without departing from the scope of the invention.

Although it is advantageous to form the protective screen by pressing a thin metal sheet, this can also be made by means of another technique suited to the use of another material. This protective screen can, for example, be obtained by moulding a synthetic material.

Having thus described the invention it is claimed:

1. A protective screen for brake disc, comprising an annular plate associated with a pivot support and with a bearing module including at least one elastic organ for holding by compression in an axial gap between the pivot support and the bearing module, present after clamping of the bearing module on to the pivot support, and at least one tongue associated with the at least one elastic organ, the at least one elastic organ being in contact with one of the pivot support and the bearing module and the at least one tongue being in contact with the other of the pivot support and the bearing module.

2. The protective screen of claim 1, further comprising a central part, the central part is flat with the exception of the elastic organ which moves progressively away from the plane of the central part.

3. The protective screen of claim 2, wherein the elastic organ is formed by a projection of the material of the screen.

4. The protective screen of claim 1, further comprising a plurality of elastic organs distributed around a central opening in the plate.

5. The protective screen of claim 1, the protective screen being formed by pressing a thin metal sheet.

6. A protective screen for a brake disc, comprising an annular plate associated with a pivot support and with a bearing module including at least one elastic organ for holding by compression in an axial gap between the pivot support and the bearing module, present after clamping of the bearing module on to the pivot support, and further comprising a central part, the central part being flat with the exception of the elastic organ which moves progressively away from the plane of the central part, wherein the elastic organ is defined by the edge of a central opening in the protective screen and by two slots opening into the said central opening.

7. The protective screen of claim 6, including two radial pressure tongues associated with the elastic organ and each is arranged on one side of the elastic organ.

8. A bearing assembly comprising a pivot support and a bearing module receiving at least a brake disc, the pivot support and the bearing module being assembled by direct clamping of the one onto the other, including a protective screen, at least two surfaces, each forming a jaw, situated on the pivot support and on the bearing module respectively, defining together after clamping of the bearing module onto the pivot support a clamp for clamping and holding an elastic organ of the protective screen, the protective screen including at least one tongue associated with the elastic organ, the elastic organ being in contact with one of the pivot support and the bearing module and the at least one tongue being in contact with the other of the pivot support and the bearing module.

9. The assembly of claim 8, the protective screen including a flat central part, said jaws bearing one on the flat central part and the other on the elastic organ of said screen.

10. The assembly of claim 8, wherein the bearing module has an axial centering block housed in an axial bore of complementary form, formed in the pivot support, and further comprising a plurality of clamps each clamping a corresponding elastic organ of said protective screen.

11. A bearing assembly comprising a pivot support and a bearing module receiving at least a brake disc, the pivot support and the bearing module being assembled by direct clamping of the one onto the other, including a protective screen, at least two surfaces, each forming a jaw, situated on the pivot support and on the bearing module respectively, defining together after clamping of the bearing module onto the pivot support a clamp for clamping and holding an elastic organ of the protective screen, wherein the bearing module has an axial centering block housed in an axial bore of complementary form, formed in the pivot support, and further comprising a plurality of clamps each clamping a corresponding elastic organ of said protective screen, including a plurality of radial pressure tongues, each having an end surface, the end surfaces of the said radial pressure tongues, each forming a centering organ, being applied to the peripheral surface of the centering block in various locations distributed all around said centering block.

12. A bearing assembly comprising a pivot support and a bearing module receiving at least a brake disc, the pivot support and the bearing module being assembled by direct clamping of the one onto the other, including a protective screen, at least two surfaces, each forming a jaw, situated on the pivot support and on the bearing module respectively, defining together after clamping of the bearing module onto the pivot support a clamp for clamping and holding an elastic organ of the protective screen, the jaws of said at least one clamp are situated one in a plane of clamping by direct contact of the pivot support and of the bearing module and the other offset relative to said clamping plane.

13. A bearing assembly comprising a pivot support and a bearing module receiving at least a brake disc, the pivot support and the bearing module being assembled by direct clamping of the one onto the other, including a protective screen, at least two surfaces, each forming a jaw, situated on the pivot support and on the bearing module respectively, defining together after clamping of the bearing module onto the pivot support a clamp for clamping and holding an elastic organ of the protective screen, the protective screen having a central opening, wherein the central opening includes at least one notch for the passage of bosses, which are either formed on the pivot support and clamped directly onto the bearing module, or formed on the bearing module and clamped directly onto the pivot support.

14. A bearing assembly, comprising:
 a pivot support having at least one clamping surface;
 a bearing module for receiving a brake disc and having a flat radial surface, the at least one clamping surface and the flat radial surface being directly clamped together, the pivot support and the bearing module forming at least one pair of jaws; and,
 a protective screen arranged between the pivot support and the bearing module and having a central opening, the central opening surrounding a portion of the bearing module, the central opening forming at least one elastic organ and an associated tongue, the elastic organ and the associated tongue being positioned within the at least one pair of jaws, the at least one elastic organ being in contact with one of the at least one clamping surface and the flat radial surface and the associated tongue being in contact with the other of the at least one clamping surface and the flat radial surface.

15. The bearing assembly, as set forth in claim 14, wherein the elastic organ includes a flexible strip and at least one radial tongue adjacent the flexible strip, the at least one pair of jaws being formed by the flat radial surface and a surface of the pivot support.

16. The bearing assembly, as set forth in claim 15, wherein the at least one radial tongue is pressed onto the flat radial surface by the flexible strip.

17. The bearing assembly, as set forth in claim 16, wherein the flexible strip is biased by the surface of the pivot support.

18. A protective screen for brake disc, comprising an annular plate associated with a pivot support, and with a bearing module including at least one elastic organ for holding by compression in an axial gap between the pivot support and the bearing module, present after clamping of the bearing module onto the pivot support, the elastic organ including a flexible strip and at least one radial tongue adjacent the flexible strip, the axial gap being formed by a surface of the bearing module and a surface of the pivot support, the flexible strip being in contact with one of the pivot support and the bearing module and the at least one radial tongue being in contact with the other of the pivot support and the bearing module.

19. The bearing assembly, as set forth in claim 18, wherein the at least one radial tongue is pressed onto the flat radial surface by the flexible strip.

20. The bearing assembly, as set forth in claim 19, wherein the flexible strip is biased by the surface of the pivot support.

* * * * *